United States Patent [19]

Bridges et al.

[11] Patent Number: 4,478,170
[45] Date of Patent: Oct. 23, 1984

[54] SPRAY GRAINER

[75] Inventors: William G. Bridges, Athens; Craig A. Foster, Cleveland, both of Tenn.

[73] Assignee: Olin Corporation, New Haven, Conn.

[21] Appl. No.: 510,691

[22] Filed: Jul. 5, 1983

[51] Int. Cl.³ .............................................. B05B 15/00
[52] U.S. Cl. ...................................... 118/64; 118/303; 264/117; 425/222; 427/242
[58] Field of Search .................... 118/64, 303, 19, 20; 425/222; 264/117; 427/242

[56] References Cited

U.S. PATENT DOCUMENTS

| | | | |
|---|---|---|---|
| T980,005 | 3/1979 | Shirley, Jr. | 264/7 |
| 2,097,914 | 11/1937 | Cooper et al. | 118/303 |
| 2,926,079 | 2/1960 | Smith | 425/222 |
| 3,101,040 | 8/1963 | Lanz | 99/335 |
| 3,333,297 | 8/1967 | Tytus et al. | 18/1 |
| 3,544,267 | 12/1970 | Dychdala | 23/86 |
| 3,580,545 | 5/1971 | O'Brien | 259/3 |
| 3,645,005 | 2/1972 | Dychdala et al. | 34/22 |
| 3,793,216 | 2/1974 | Dychdala et al. | 252/187 |
| 3,877,415 | 4/1975 | Blouin | 118/303 |
| 3,894,882 | 7/1975 | Takewell et al. | 186/288 |
| 3,991,225 | 11/1976 | Blouin | 427/3 |
| 4,127,388 | 11/1978 | Maczko et al. | 422/258 |
| 4,258,024 | 3/1981 | Hoffer et al. | 423/474 |
| 4,272,234 | 6/1981 | Tse | 425/222 |
| 4,328,200 | 5/1982 | Welch et al. | 423/474 |
| 4,353,852 | 10/1982 | Tse | 264/37 |
| 4,355,014 | 10/1982 | Murakami et al. | 423/265 |
| 4,370,530 | 1/1983 | Wayland | 200/144 |

Primary Examiner—Shrive P. Beck
Attorney, Agent, or Firm—Ralph D'Alessandro; Donald F. Clements; Thomas P. O'Day

[57] ABSTRACT

In a rotary drum spray grainer there is provided a deflector plate overlying the spraying nozzles in the spraying zone to provide a drying zone where spray grained particles fall in a substantially uninterrupted downward path through the drying gas.

19 Claims, 5 Drawing Figures

SPRAY GRAINER

BACKGROUND OF THE INVENTION

This invention relates generally to rotary spray grainers and more particularly to the use of a deflector plate in a spray grainer to provide distinct spraying and drying zones for the formation of spray grained calcium hypochlorite.

The use of a rotary drum apparatus to apply coatings or encapsulations to particulate substrates by the spraying of slurries, melts, or solutions and suspensions onto moving beds of particles that fall in cascades within the apparatus is well known. The application of distinct and separate coatings to a particulate substrate is known as granulation and is widely used in the fertilizer industry, for example in the production of ammonium nitrate. The application of coatings or encapsulations on a particulate substrate can also be employed in the making of confections, such as sugars, or, as in the case of the instant invention, in the manufacture of calcium hypochlorite for use as a commercial bleaching and sanitizing agent, particularly in the disinfection of swimming pool waters.

Previous attempts to employ a rotary drum dryer in the process of manufacturing spray grained particles have employed either a deflector means that runs the entire length of the rotary drum and which overlies the spraying means or nozzles or, in the alternative, utilize no deflector means in the rotary drum. Both of these approaches have their disadvantages which prevent the rotary dryer or spray grainer from achieving its optimum operating efficiency.

In apparatus which does not employ a deflector plate and which is rotated at a sufficient speed to obtain a full cascade of falling particles across the entire cross-sectional area, the slurried material being sprayed on the particulate particles does not achieve optimum spray pattern dispersion to uniformly wet the particles. The slurry is formed from a solid or semi-solid that is reduced to a sprayable liquid state by melting or by dissolution or suspension in an appropriate solvent. Frequently in this type of apparatus, the slurry will penetrate the falling wall or cascade of particulate substrate or particles and buildup on the interior walls of the drum, creating scaling. Alternately, in this type of apparatus the falling cascade of the particulate substrate will fall in a path that causes it to strike the spraying nozzles or spraying means, thereby causing the spraying means or nozzles to clog and buildup an accumulation of the slurry being sprayed.

Another approach not utilizing a deflector plate or deflector means in a rotary spray grainer uses rods disposed substantially parallel to each other and to the longitudinal axis of the drum radially inwardly of the interior walls of the drum. These rods facilitate the falling of particles in cascades or curtains so that the agglomerating agent or slurry may be sprayed into the cascades. However, this design still suffers from the disadvantage of permitting the particles to impinge on the spraying nozzles and thereby cause clogging.

In rotary drum dryers not utilizing deflector plates or other deflector means, avoidance of the impingement of particles on the spraying means has been achieved by keeping the drum rotational speed sufficiently low. This permits the nozzles or spraying means to disperse the slurried material to achieve the optimum spray pattern dispersion to uniformly wet the falling particles. While this avoids the impingement problem, it adversely affects the quality of the spray grained product obtained and reduces the capacity of the dryer. Both of these results are clearly not desireable.

In other rotary drum dryer apparatus using the spray graining principle, deflector means or deflector plates were provided that ran substantially the entire length of the drum. This full length deflector plate would protect the spraying means or nozzles from impingement by the falling cascade of particulate substrate and would avoid the concomitant clogging of the nozzles due to slurry buildup. The deflector plate also provides a dense cascade of falling particles at a fixed distance from the spray nozzles to permit a full slurry spray pattern to be obtained. However, the full length deflector means causes channeling of the hot air or gas used to dry the sprayed particles and prevents a full cascade from being obtained across the entire width or cross-sectional area of the drying zone during operation. This results in a lower heat transfer factor that gives poor quality spray grains and requires a longer drying time because of the less efficient use of the available heat energy.

These problems are solved in the design of the present invention by employing deflector means in a rotary drying drum overlying the spraying nozzles in the spraying zone, but not extending into the drying zone.

SUMMARY OF THE INVENTION

It is an object of the present invention to provide a novel rotary drum dryer for use in spray graining particulate substrates or particles which employs at least one deflector means over only a portion of the length of the rotary drum comprising the spraying zone.

It is another object of the present invention to provide an improved spray grainer or rotary drum dryer with improved heat transfer characteristics in the drying zone.

It is a feature of the present invention that a deflector plate or deflector means is used only in the spraying zone where it overlies the spraying means.

It is another feature of the present invention that at least one deflector plate collects the cascades of falling particles within the rotary drum, preventing them from striking or falling on top of the spraying means and to minimize the number falling behind the spraying means.

It is another feature of the present invention that there is at least one drying zone that provides a substantially uninterrupted downward path along which the spray grained particles fall as heated gas is forced through the drying zone.

It is an advantage of the present invention that the rotary drum spray grainer can operate at higher rotary speeds to obtain cascading over the entire cross sectional area of the drum in the drying zone.

It is another advantage of the present invention that hot air channeling in the drying zone is reduced and increased heat transfer is obtained.

It is still another advantage of the present invention that more efficient use of the available heat energy is obtained and, therefore greater output capacity is possible.

It is a further advantage of the present invention that a dense cascade of falling particles off of the deflector means is obtained and is directed in front of the spraying means or nozzles to provide a better target for the sprayed slurry or agglomerating agent.

It is still another advantage of the design of the present invention that the spray grained calcium hypochlorite particles experience less loss of available chlorine during drying.

These and other objects, features and advantages are obtained in a rotary drum dryer for spray graining particles by having at least one deflector means overlying the spraying means in at least one spraying zone to provide at least one drying zone where the spray grained particles fall in a substantially uninterrupted downward path through the heated gas to obtain full cascading across the width of the rotary drum.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of a rotary drum dryer used for spray graining with a portion cut away to show the deflector plate on the interior of the drum and with the lifting flights not shown;

FIG. 2 is a diagramatic cross sectional illustration of a rotary drum spray grainer of the instant design not showing the lifting flights;

FIG. 3 is a sectional view along the lines 3—3 of FIG. 2 showing the cascades of spray grained particles as they fall from the deflector plate into the spray slurry pattern;

FIG. 4 is a sectional view taken along the lines 4—4 of FIG. 2 showing the substantially uninterrupted downward path of cascades of spray grained particles through the drying zone; and FIG. 5 is diagramatic cross-sectional illustration of an alternative embodiment of a rotary drum spray grainer employing two deflector plates and two drying zones and not showing the lifting flights.

DETAILED DESCRIPTION OF THE PREFERRED EMBODIMENT

Referring to FIG. 1, there is shown a rotary drum dryer, indicated generally by the numeral 10, with a portion cut away to show the interior of the dryer 10. The inlet hot air or hot gas plenum 11 is shown positioned adjacent a first end of the rotary drum dryer 10. An inlet 12 with reduced diameter at the first end leads into the interior of the drum dryer 10. The rotary drum dryer 10 has a drum 14, generally cylindrical in shape, that extends from a position adjacent the inlet hot air plenum 11 into the outlet hot air plenum 16. A recycle chute 15 is shown winding in a helical pattern about the outside of the drum 14 to recycle product and fines from the second end of the rotary drum dryer 10 adjacent the outlet hot air plenum 16 to the first end of the rotary drum dryer 10 adjacent the inlet hot air plenum 11.

Also shown in FIG. 1 is the deflector means or plate 18 that is appropriately mounted to a support beam 19 that runs the entire length of the apparatus through the inlet 12 to the outlet hot air plenum 16. Spraying means 20, generally in the form of spray nozzles, as seen in FIG. 2, are positioned in a spraying zone 21 that underlies the deflector means 18. The spraying means 20 may be supported by the support beam 19, if appropriate. A drying zone 22 is intermediate the spraying zone and the opposing second end of the rotary drum dryer 10 adjacent the outlet hot air plenum 16. In FIG. 1, an appropriate type of conveyor, such as a screw conveyor 24, is provided to feed seed particles and fines through the inlet 12 into the interior of the drum 14. In FIG. 2, this is shown diagrammatically as a feed inlet means 25.

A product discharge 26 leads to the final dryer (not shown). Spray grained particles enter the product discharge 26 by a rolling bed classification process which permits the larger spray grained particles to pass over the inlet 12 with its reduced diameter, seen in FIG. 1, when the depth of the particle bed 41 of FIG. 2 is sufficiently great. The rolling bed classification is accomplished in a classification zone or area 23 that begins in the drum dryer 10 and continues to the inlet 12.

Recycle chute 15 has a recycle chute pick-up 28 adjacent the second end of the rotary drum dryer 10, as seen in FIG. 2, to permit spray grained particles and the fines to enter the recycle chute 15 and be returned to an area 27 adjacent the first end or inlet 12 of the rotary drum dryer 10. Rolling bed classification occurs at this point to permit the full sized spray grained particles to exit into the product discharge 26 and the remainder to be cycled through the rotary drum dryer 10 for additional spraying until full-sized spray grained particles are obtained. A full dam ring 39, as seen diagrammatically in FIG. 2, may be employed to control the entry of spray grained particles into the recycle chute pick-up 28. This full dam ring 39 would pass through 360° about the entire internal periphery of the drum 14.

As seen in FIGS. 3 and 4 lifting flights 40 are used about the entire internal periphery or diameter of the drum 14 in the drying zone 22 and the spraying zone 21. There may be an area of interruption of the flights in an area of the spraying zone 21 adjacent the drying zone 22 and in an area immediately adjacent the inlet 12 to permit rolling bed classification to occur. The flights may be from about one and a half to about eight inches in height, depending on the size of drum 14. Another area where no flights are employed may be adjacent the second end of the drum 14 where the outlet hot air plenum 16 is located. The area with no flights adjacent the first and second ends of the drums may extend for as much as three feet or more in length, depending upon the overall length of the drum 14. The lifting flights 40 permit the bed of particles 41 to be agitated and carried upwardly until the angle of the flight as it moves in its rotational travel exceeds the angle of repose of the particles so that the particles fall in cascades 42 generally downwardly toward the bed. It is the paths of these falling cascades that permit them to be sprayed with the slurry or agglomerating agent in the spraying zone 21 and to be dried with the passage of gas, generally hot air, through them in the drying zone 22.

As seen in FIG. 3, the deflector means 18 may be an inverted V shape that is appropriately mounted to the support beam 19 or, as is not shown, simply a generally rectangular shape overlying the spraying means to form a full dense cascade of materials falling off the edge thereof and also to overlie and protect the spraying means 20 from having the particles impinge thereon. The positioning of the edge of the deflector means 18 at the desired distance away from the spraying means 20 is such that the dense cascades 42 of particles to be sprayed are at an optimum distance so that the predetermined slurry spray pattern may achieve its optimum dispersion to prevent overwetting of the particles. Also, passage of the spray through the cascade does not occur so that the interior of the drum 14 does not have scaling or buildup of the slurry.

Figure 1:
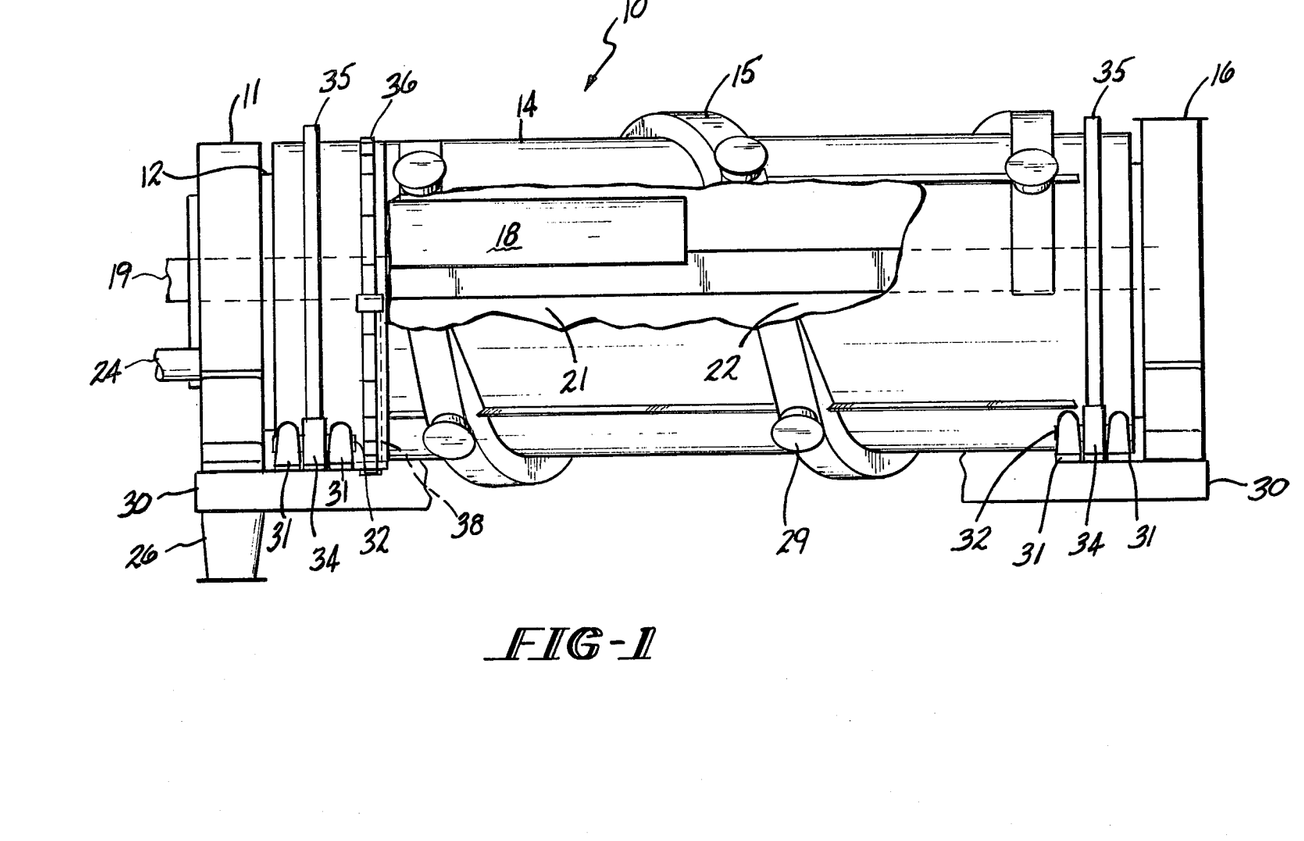

As best seen in FIG. 1, the drum 14 is mounted on support beam 30 which has bearing 31 and trunnions 32 which support the drum for rotational movement. A rotating trunnion wheel 34 is positioned at each end of the drum 14 between the bearings 31 to engage a metal track 35 to guide the drum 14 in its rotary movement. A drive sprocket 36 is employed adjacent one end of the drum 14 to provide the driving force to rotate the drum at the predetermined rotational speeds.

A partial dam ring 38 seen in FIG. 1, extends from the recycle entry area 27 partially about the inside of the drum 14, for example from about one quarter to about one half or greater of the inner circumference. The material returned from the recycle chute 15 enters the drum internally or centrally of the partial dam ring 38 and is prevented from freely entering the rolling bed classification area adjacent the inlet 12 or first end by the partial dam ring. This permits a controlled, gradual and continuous feed of full sized particles into the product outlet 26. This also avoids the uneven surging of material into the rolling bed classification area or zone and product discharge 26 that might otherwise occur.

Figure 5:
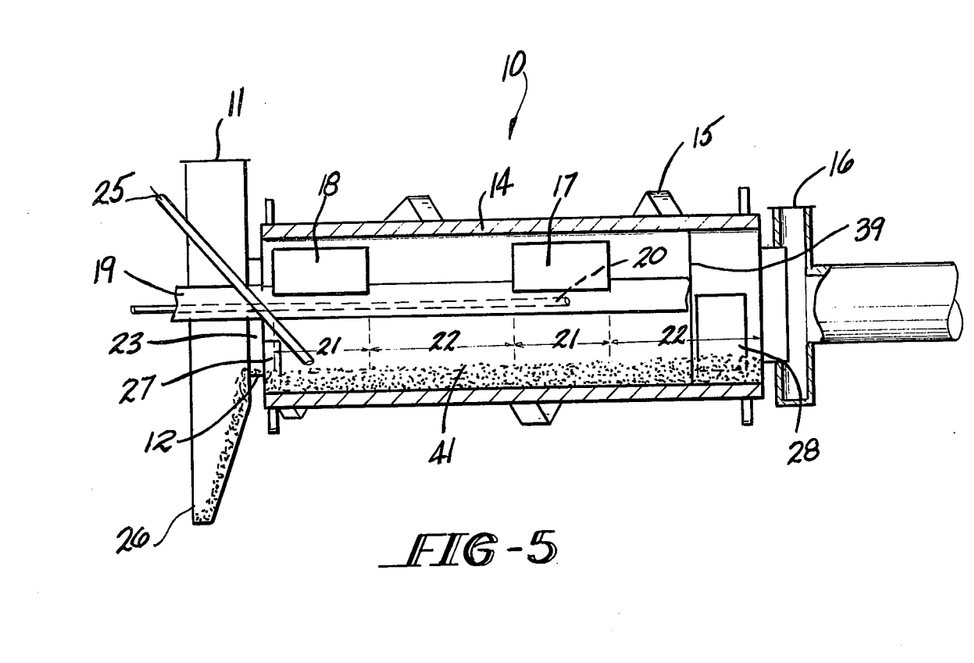

An alternative embodiment is shown in FIG. 5 wherein a plurality of deflector means 17 and 18 are employed within the rotary drum dryer 10 to create multiple spraying zones 21 and drying zones 22. In this embodiment a spraying zone is immediately adjacent the drying zone which is then followed by a second spraying zone and a second drying zone. An arrangement such as this can be employed to reduce the agglomeration that may otherwise occur if all of the coating of the particular substrate is accomplished in a single spraying zone where temporary overwetting could occur. In this embodiment, two deflector plates 17 and 18 are axially spaced apart from each other. Each plate will be a predetermined axial length and the plates will be spaced a desired distance apart. The deflector plates 17 and 18, as would be the case in a drum dryer 10 employing a single deflector means, are also a predetermined distance from the farthest edges of the deflector plates to the spraying means or nozzles 20. These distances will vary depending upon the diameter and length of the drum 14, the type of spray nozzles employed, and the speed of rotation of the drum.

In operation, a calcium hypochlorite slurry is prepared from a filter cake obtained from an appropriate filter. The slurry is prepared by mixing with water until a paste consistency similar to that of soft ice-cream is obtained, corresponding to approximately about 50% to about 59% composition of water by weight.

The rotary drum 10 is set to the desired angle from the horizontal to affect the bed transport rate, if necessary. Generally, however, the rotary drum dryer 10 will be set generally horizontally.

The rotary drum 10 is heated by feeding in the heated air or other inert gas to raise the temperature of the rotary drum dryer 10 and its metal to the desired level. A bed 41 is built up in the bottom of the drum to a level until it begins to overflow the drum inlet 12. A predetermined desired amount of seed particles is fed into the drum dryer 10 via the screw conveyor feed inlet means 24 after the bed has been heated to approximately 140° to about 150° F. This temperature of the bed 41 is determined for example, by placing a temperature probe under the surface of the rolling bed. At a predetermined time after the seed particle flow has started, such as approximately one minute, spraying from the spraying means 20 of the slurry may commence. The air flow of heated air or other inert gas is maintained at a uniform rate to achieve maximum efficiency in the drying. The air inlet temperature can vary from approximately 260° F. to approximately 390° F., although the preferred temperature is between about 310° F. and about 360° F. Rotation of the drum commences with the infeed of the heated air prior to the loading of the drum, seed flow and spraying.

Figures 2, 3, 4:
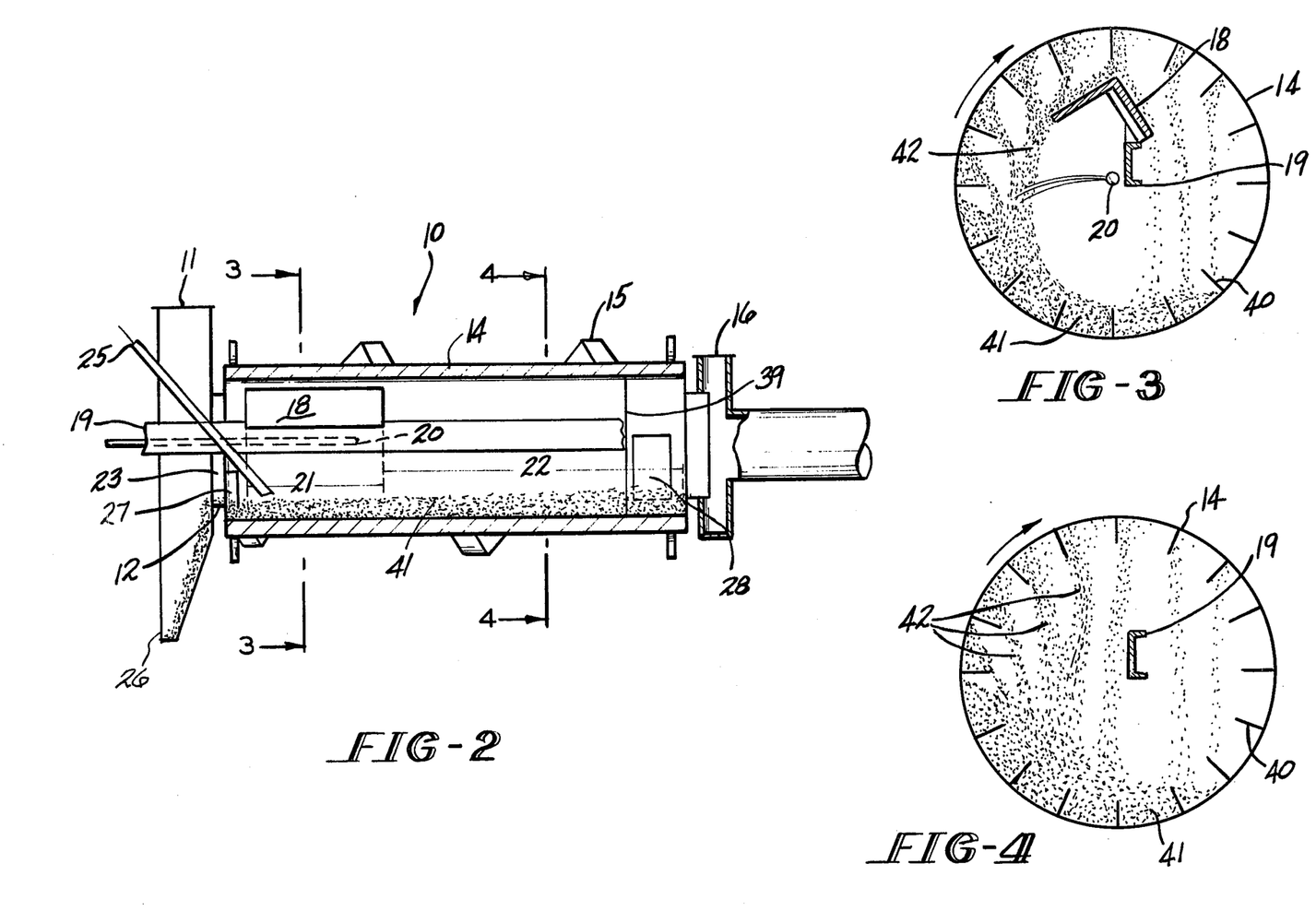

As the drum rotates, the lifting flights 40 agitate and carry portions of the bed 41 upwardly until the particles begin to fall from the lifting flights 40 in cascades 42 when the angle of repose is exceeded. When this occurs in the spraying zone 21, as seen in FIG. 3 the cascades fall downwardly by striking the deflector means 18 and by being deflected into one thick cascade, falling closer to the outer wall of the drum 14 where the spraying means or nozzles 20 disperse the slurry in a predetermined pattern to optimize the wetting of the particulate substrate to effect the spray graining. In this manner the particles may pass through the spray pattern more than once.

When the particles have fallen to the bottom of the bed and continued their axial movement through the spraying zone 21 to the drying zone 22, the rotation of the drum 14 causes the lifting flights 40 to carry the particles upwardly from the bed 41 again until a height is reached as the drum rotates where the angle of repose is exceeded, as is shown in FIG. 4. Particles then fall in a generally substantially uninterrupted downward path through the drying zone 22 where they are exposed to the heated air or gas passing through the rotary drum dryer 10. This generally uninterrupted downward path of the particles permits maximum heat transfer to occur in the drying zone 22. The prevention of hot air channelling in the drying zone permits heat exchange to occur across the full width or the entire cross-sectional area of the drying zone.

When the particles in the bed 41 reach the second end of the rotary drum dryer 10 adjacent the outlet hot air plenum 16, they enter the recycle chute pickup 28. The particles are then conveyed within the recycle chute 15 by the rotational movement of the drum 14 back to an area 27 within the rotary dryer drum 10 interiorly of the partial dam ring 38 where they are redeposited with any fines into the interior of the drum. As the drum 14 rotates, the spray grained particles of the desired type rise to the top and pass around and over the partial dam ring 38 into an area 23 where rolling bed classification is achieved and the product exits the rotary drum dryer 10 through the product discharge 26. Product particles that are undersized or fines that do not pass around or over the partial dam ring 38 and out the inlet 12 into the product discharge 26 are then recycled through the spraying zone 21 and the drying zone 22 until the particles have achieved the desired size.

The heated air or other inert gas contacts the calcium hypochlorite particles wetted with the slurry to simultaneously evaporate and remove water and to deposit a thin layer of the calcium hypochlorite containing component of the slurry on the surface of the wetted particles. The coated particles continue in the moving bed 41 and continue to be lifted, dropped and coated until they are discharged from the rotary drum dryer 10 as previously described. As the number and size of the calcium hypochlorite granules or particles coated with the slurry composition increases, the moving bed 41 builds up beyond the discharge retaining partial dam ring 38 until a level is reached where the particles pass over the drum inlet 12 and fall into the product discharge 26. From the product discharge 26 they pass into the final dryer (not shown).

The composition of the slurry may vary considerably, with any pumpable and sprayable calcium hypochlorite slurry containing from about 45% to about 90% by weight of water and preferrably from about 50% to about 60% by weight of water being employable. Generally, the slurry is prepared by admixing water with the filter cake, a calcium hypochlorite produced in any conventional commercial calcium hypochlorite process. Although water is normally used to make up the slurry, any suitable recycle liquid such as a portion of the filtrate produced in commercial calcium hypochlorite processes, scrubber liquor, or other aqueous medium that is inert to calcium hypochlorite may be employed.

The controlling factor in the preparation of this slurry is the percentage by weight of water that is present. Where the percentage by weight of water is below about 45% by weight, the resulting slurry is extremely difficult to pump and spray because it is too viscous and is cake-like, restricting the flow through the pipeline to the spraying means or nozzle. It could also plug the nozzle at this percentage. Where the water concentration is above about 90% by weight, an extremely large amount of water must be evaporated. As a result, the feed rate must be reduced and the production rate is reduced. Furthermore, there is likely to be excessive decomposition of the available chlorine in the calcium hypochlorite particles when the moist calcium hypochlorite particles must be exposed to the heated atmosphere in the drying zone and the final dryer for the extended periods of time that are necessary to effect the evaporation of excessive amounts of water.

It should be noted that the proportion of impurities in the calcium hypochlorite slurry will vary with the type of process employed to prepare the calcium hypochlorite filter cake and also with the nature of the lime initially used to prepare the calcium hypochlorite. A representative analysis of a typical calcium hypochlorite filter cake prepared by commercial process and a typical preferred analysis range for the calcium hypochlorite filter cake used to prepare the slurry sprayed from the spraying means 20 in the predetermined slurry spray pattern and useful as the starting material in the preparation of particles by the spray graining technique are shown in the following Table I. The slurry is obtained from the filter cake, for example, by the addition of water.

TABLE I

| Component | Typical Filter Cake Analysis Percent by Weight | Typical Analysis Range Percent by Weight |
| --- | --- | --- |
| Calcium hypochlorite | 45.43 | 42–48 |
| Calcium chloride | 0.44 | 0.0–1.5 |
| Calcium chlorate | 0.02 | 0.0–1.5 |
| Calcium hydroxide | 0.24 | 0.2–2.0 |
| Calcium carbonate | 0.44 | 0.1–2.0 |
| Sodium chloride | 7.75 | 6.0–8.0 |
| Water (difference) | 45.68 | 40–50 |

The rate of infeed of forced air utilized as the heated air or other inert gas can vary from about 85 to about 340 feet per minute. The temperature of the heated gas at the inlet hot air plenum 11 has previously been described. The exhaust gases pass from the rotary drum dryer 10 at the outlet hot air plenum 16 and can vary in range from about 130° to about 170° F.

The effect of the flow of the forced air into the drum dryer 10 at the inlet 12 and the point of exit to the product discharge outlet 26 is to produce air classification of the particles. The velocity of the air, since the direction of air flow into the drum is countercurrent to the flow of particles out of the drum, forces smaller particles back into the drum so they can be recycled and grow in size. The larger particles, because of their mass, can overcome the air drag and exit the drum.

In order to exemplify the results achieved, the following Example is provided without any intent to limit the scope of the instant invention to the discussion therein. The Example is intended to illustrate the results that can be obtained in a rotary spray grainer drum type of dryer employing at least one deflector plate overlying the spraying zone and at least one drying zone which provides a substantially uninterrupted downward path for the spray grained particles to cascade through.

EXAMPLE

An eighteen inch diameter rotary dryer drum with helical recycle chute affixed about the outside was utilized. The drum dryer was operated at an angle of about 0.9° downwardly towards the front or inlet end. The static pressure (vacuum) for all of the runs performed were 0.1 to 0.15 inches WG (water gauge) at the air inlet to the drum, and 0.25 inches WG at the drum outlet. The hot air flow or drying gas rate was usually about 280 feet per minute. This hot air entered the drum at about 260° F. to about 310° F. and exited the drum at about 145° F. to about 180° F. The bed temperatures for the spray grained particles was from about 125° F. to about 145° F. Measurements were made hourly during the two runs as reflected in the enclosed Table II. The instantaneous rates were calculated on a wet basis reflecting the true or actual weight and on a dry basis with all the available water theoretically being evaporated. Table IIA shows the averages from the hourly measurements shown in Table II.

TABLE II

A. Material Balance

| | | Temperatures, °F. | | | Instantaneous Rates, lb/min. | | | | | | | | | |
| | | Air | Air | | Seed | | Slurry | | Product | | Dust | | Recycle | |
| Run | Time | Inlet | Outlet | Bed | WB | DB | WB | DB | WB | DB | WB | DB | WB | DB | % H$_2$O Bed |
| 1. | 0100 | 300 | 165 | 132 | 0.749 | 0.714 | 1.24 | 0.558 | 1.69 | 1.31 | 0.114 | 0.093 | .408 | 0.319 | 22.5 |
| | 0200 | 294 | 164 | 131 | 0.703 | (.67) | 1.37 | (.61) | 1.39 | (1.08) | 0.144 | (.115) | 0.464 | (.362) | |
| | 0400 | 296 | 160 | 127 | 0.825 | 0.776 | 1.76 | 0.788 | 1.99 | 1.542 | 0.180 | 0.147 | 0.436 | 0.338 | 23.7 |
| | 0500 | 293 | 158 | 126 | 0.349 | 0.327 | 0.63 | 0.286 | 1.19 | 0.908 | 0.155 | 0.122 | 0.285 | 0.221 | |
| | 0700 | 294 | 160 | 130 | 0.324 | (3.05) | 1.47 | (.662) | 1.24 | (0.93) | 0.270 | (.213) | 0.367 | (.275) | |

TABLE II-continued

A. Material Balance

| | | Temperatures, °F. | | | Instantaneous Rates, lb/min. | | | | | | | | | | |
|---|---|---|---|---|---|---|---|---|---|---|---|---|---|---|---|
| | | Air | Air | | Seed | | Slurry | | Product | | Dust | | Recycle | | |
| Run | Time | Inlet | Outlet | Bed | WB | DB | WB | DB | WB | DB | WB | DB | WB | DB | % H₂O Bed |
| | 0900 | 292 | 160 | 125 | 0.421 | 0.400 | 1.56 | 0.721 | 1.36 | 0.99 | 0.114 | 0.090 | 0.426 | 0.315 | 27 |
| | 1000 | 295 | 162 | 129 | 0.421 | (.400) | 1.17 | (.54) | 1.05 | (.78) | 0.155 | (.127) | 0.376 | (.28) | |
| | 1200 | 295 | 170 | 130 | 0.654 | (.621) | 1.42 | (.65) | 1.26 | (.94) | 0.120 | (.100) | 0.365 | (.271) | |
| | 1300 | 297 | 170 | 126 | 0.654 | 0.618 | 1.17 | 0.531 | 1.13 | 0.86 | 0.120 | 0.101 | 0.368 | 0.280 | 26 |
| | 1400 | 310 | 163 | 132 | 0.654 | (.62) | 1.37 | (.63) | 1.47 | (1.10) | 0.108 | (.092) | 0.360 | (.27) | |
| | 1500 | 302 | 162 | 133 | 0.696 | (.66) | 1.36 | (.64) | 1.50 | (1.13) | 0.127 | (.109) | 0.478 | (.36) | |
| | 1600 | 302 | 167 | 135 | 0.679 | (.64) | 1.71 | (.80) | 1.56 | (1.17) | 0.130 | (.115) | 0.368 | (.276) | |
| | 1700 | 297 | 157 | 134 | 0.497 | 0.470 | 1.41 | 0.663 | 1.26 | 0.95 | 0.160 | 0.14 | 0.481 | 0.370 | 24.8 |
| | 1800 | 290 | 159 | 133 | 0.599 | (.566) | 1.32 | (.62) | 1.54 | (1.17) | 0.178 | (.15) | 0.378 | (.291) | |
| | 1900 | 296 | 160 | 135 | 0.599 | (.566) | 1.28 | (.60) | 1.45 | (1.12) | 1.202 | 0.173 | 0.358 | (.277) | |
| | 2130 | 297 | 154 | 135 | 0.544 | 0.514 | 1.49 | 0.700 | 1.67 | 1.34 | — | — | 0.627 | 0.502 | 21.6 |
| | 2300 | 298 | 163 | 138 | 0.530 | (.504) | — | — | 1.82 | (1.37) | 0.182 | 0.156 | 0.567 | (.425) | |
| 2. | 0100 | 297 | 162 | 130 | 0.728 | 0.684 | 1.14 | .537 | 1.56 | 1.16 | 0.230 | 0.20 | 0.713 | .538 | 25.5 |
| | 0200 | 297 | 160 | 127 | 0.486 | (.457) | 1.39 | (.65) | 1.23 | (.923) | 0.170 | (.15) | 0.559 | (.42) | |
| | 0300 | 300 | 168 | 129 | 0.388 | (.365) | 1.09 | (.51) | 1.62 | (1.22) | 0.146 | (.126) | 0.626 | (.47) | |
| | 0500 | 302 | 165 | 130 | 0.511 | .483 | .99 | .463 | 1.05 | .801 | 0.112 | 0.095 | 0.384 | .293 | 23.7 |
| | 0600 | 298 | 162 | 133 | 0.608 | (.56) | 1.14 | (.536) | 1.52 | (1.16) | 0.165 | (.14) | 0.560 | (.427) | |
| | 0700 | 297 | 160 | 131 | 1.16 | (1.08) | 1.34 | (.64) | 1.39 | (1.06) | 0.148 | (.12) | 0.497 | (.38) | |
| | 0900 | 305 | 155 | 133 | 0.403 | .374 | 1.00 | .485 | 1.12 | .847 | 0.212 | .172 | 0.370 | .28 | 24.4 |
| | 1000 | 306 | 158 | 135 | 0.475 | (.444) | 1.30 | (.629) | 1.28 | (.766) | 0.191 | (.156) | 0.367 | (.277) | |
| | 1100 | 298 | 160 | 132 | 0.475 | (0.44) | 1.20 | (.576) | 1.16 | (0.97) | 0.219 | (0.18) | 0.511 | (0.38) | |
| | 1200 | 305 | 157 | 140 | 0.190 | (0.18) | 1.05 | (.499) | 1.04 | (0.77) | 0.191 | (0.16) | 0.501 | (0.37) | |
| | 1300 | 302 | 160 | 132 | 0.190 | 0.178 | 1.35 | (.637) | 0.845 | 0.618 | 0.159 | 0.141 | 0.347 | 0.26 | 26.9 |
| | 1400 | 304 | 159 | 138 | 0.190 | (0.178) | 1.05 | (.501) | 0.660 | (0.49) | 0.186 | (0.164) | 0.460 | (.34) | |
| | 1500 | 306 | 170 | 140 | 0.283 | (0.264) | 1.05 | (.501) | 0.735 | (0.57) | 0.171 | (0.15) | 0.337 | (0.26) | |
| | 1600 | 306 | 165 | 141 | 0.283 | (0.264) | 1.15 | (.552) | 0.650 | (.52) | 0.176 | (.15) | 0.352 | (0.29) | |
| | 1700 | 307 | 160 | 143 | 0.283 | 0.264 | 1.20 | (.577) | 0.950 | .777 | 0.286 | 0.251 | 0.355 | 0.291 | 18.2 |
| | 1800 | 306 | 158 | 142 | 0.702 | (0.656) | 1.37 | (.658) | 1.28 | (1.04) | 0.330 | (0.29) | 0.363 | (0.29) | |
| | 1900 | 300 | 160 | 135 | 0.702 | (0.656) | 1.09 | (.51) | 1.27 | (1.04) | 0.371 | (0.32) | 0.358 | (0.29) | |
| | 2000 | 296 | 159 | 131 | 1.07 | (1.00) | 1.24 | (.58) | 1.73 | (1.30) | 0.145 | (0.12) | 0.508 | (0.38) | |
| | 2100 | 297 | 161 | 132 | 0.643 | .603 | 0.985 | 0.454 | 2.28 | 1.67 | 0.166 | 0.137 | 0.501 | 0.371 | 26.9 |
| | 2300 | 300 | 160 | 123 | 0.328 | (.305) | 1.674 | (.77) | 1.35 | (1.01) | 0.103 | (0.084) | 0.553 | (0.41) | |
| | 2400 | 303 | 161 | 123 | 0.326 | (.303) | 0.985 | (.453) | 1.33 | (1.01) | 0.116 | (0.095) | 0.437 | (0.34) | |

TABLE IIA

Spray Grainer Mode

| | Temperature (°F.) | | | Rates (lb/min, D.B.) | | | | | Bed | Seed Dia. |
|---|---|---|---|---|---|---|---|---|---|---|
| Run No. | Air in | Air Out | Bed | Air | Seed | Slurry | Product | Fines | % H₂O | Avg. min |
| 1 | 300 | 163 | 133 | 34.0 | 0.59 | 0.67 | 1.10 | 0.12 | 25.6 | 0.74 |
| 2 | 305 | 164 | 138 | 34.0 | 0.22 | 0.55 | 0.55 | 0.15 | 22 | 0.81 |

The heat transfer factor was calculated to represent the amount of heat transferred to the material falling in each cascade per unit of temperature. Heat transfer factors were calculated for the eighteen inch diameter drum dryer based upon an estimated drum rotational speed of 22 revolutions per minute and from the drum holdup for each run. Drum holdup is defined as the total weight of the seed particles, fines and spray grained particles within the drum dryer 10 at a particular point in time. The material cascade rate was estimated from the drum holdup and the drum rotational speed. Heat transferred to the grains was estimated from the actual evaporation rates given in the Table III below.

In Table II, the underlined dry basis data indicates data for which water content measurements were actually made in the process streams. The bracketed or parenthesized dry basis data indicates data which was calculated based on interpolated water content in the process streams. The one exception is found in the Run Number 1 data shown at 0400 and 0500 hours where the actual bed water content was measured at 0430 hours and applied to the 0400 and 0500 hour runs.

TABLE III

Calculation of Evaporation Rate

| Run No. | Seed Diam. (mm) | $\left(\dfrac{d\ seed}{d\ prod.}\right)$ | Net Prod. Rate (Slurry Rate) DB lb/min | % H₂O in Product | % H₂O in Shell | $\left(\dfrac{Seed\ Rate}{Paste\ Rate/Seed\ Rate}\right)$ |
|---|---|---|---|---|---|---|
| 1 | 0.74 | 0.75 | 0.67 | 25.6 | 37.1 | 0.468 |
| 2 | 0.81 | 0.54 | 0.55 | 22 | 27.0 | 0.286 |

| Run No. | $\left(\dfrac{lb\ H_2O\ Removed}{lb\ of\ Shell,\ DB}\right)$ | Actual Evap. Rate (lb H₂O/min.) | Temp. corr.* Factor | Evap. Rate* At Base Condition (lb H₂O/min) |
|---|---|---|---|---|
| 1 | 0.632 | 0.423 | 0.985 | 0.417 |

TABLE III-continued

| Calculation of Evaporation Rate | | | | |
|---|---|---|---|---|
| 2 | 0.853 | 0.469 | 0.957 | 0.449 |

*Base Condition-305° F. inlet air, 170° F. outlet air, 34 lb/min air.

The Heat transfer factor was calculated as follows, where U equals the heat transfer factor given in Btu/ft³ cascade—°F.

$$(\Delta T)\text{Log Mean} = \frac{(T_{inlet} - T_{bed\ inlet}) - (T_{outlet} - T_{bed\ outlet})}{\ln\left(\frac{T_{inlet} - T_{bed\ inlet}}{T_{outlet} - T_{bed\ outlet}}\right)}; °F.$$

Q=Heat input=Btu/min; calculated for evaporation rate
C=Material cascade rate=ft³/min-ft=2.5×(drum rpm)×(volume bed/length of bed)
Which can be reduced to:
C=0.18×(lbs of bed holdup)
L=length of drum=5 ft
The heat input is also equal to the heat transferred $$Q = U\ C\ L\Delta T_{LM}$$

Where U=heat transfer factor=Btu/ft³ cascade—°F. so therefore U may be calculated from Q, C, L, and $\Delta T_{LM}$ $U=Q/CL\Delta T_{LM}$.

Results of calculation of "U" for each run is shown in the following Table IV.

TABLE IV

| | Heat Transfer Factors | | | |
|---|---|---|---|---|
| Run No. | Heat Transferred From Grains (Btu/Min) | Temperature Difference (log-mean, °F.) | Drum Hold-Up (lbs, D.B.) | Heat Transfer Factor (Btu/ft³ cascade-°F.) |
| 1 | 508 | 79.8 | 25 | 0.25 |
| 2 | 563 | 75.8 | 25 | 0.30 |

What is claimed is:

1. In an elongate, hollow drum having an arcuate interior for forming spray grained particles, the particles accumulating in a bed at the bottom of the drum, the drum being rotatably mounted on support means and having a first end and an opposing second end, the first end and opposing second end lying along the longitudinal axis of the drum, the drum being rotatable about the longitudinal axis, comprising in combination:
   a. feed inlet means adjacent the first end for feeding seed particles and product fines into the drum;
   b. spraying means positioned within the drum adjacent the first end for spraying the slurry in a predetermined slurry spray pattern thereby defining at least one spraying zone within the drum intermediate the first end and the opposing second end;
   c. drying means for introducing a heated gas into the drum for drying the spray grained particles;
   d. deflector means extending only in the at least one spraying zone to deflect falling seed particles, product fines and spray grained particles overlying the spraying means and thereby defining the upper limit of the spraying zone;
   e. at least one drying zone intermediate the spraying zone and the opposing second end where spray grained particles fall in a substantially uninterrupted downward path through the heated gas; and
   f. spray grained product particle outlet means for removing the product particles from the drum.

2. The drum according to claim 1 further comprising a plurality of parallel, radially dispersed and spaced apart lifting flights about the arcuate interior in the at least one drying zone to carry the spray grained particles upwardly as the drum rotates until the particles fall in cascades downwardly toward the bed.

3. The apparatus according to claim 2 further comprising a plurality of parallel, radially dispersed and spaced apart lifting flights in the at least one spraying zone.

4. The apparatus according to claim 1 further comprising the spray grained product outlet means being adjacent the first end.

5. The apparatus according to claim 4 further comprising the drying means having an inlet at the first end.

6. The apparatus according to claim 2 further comprising the deflector means forming at least one generally elongate rectangular surface having a first edge farthest from the spraying means and a second edge closest to the spraying means.

7. The apparatus according to claim 6 further comprising the first edge being a predetermined desired distance from the spraying means so that the cascade of falling particles deflect off of the deflector means into the predetermined slurry spray pattern.

8. The apparatus according to claim 1 further comprising the drum having an annular dam ring of predetermined height extending continuously about the arcuate interior adjacent the second end.

9. The apparatus according to claim 1 further comprising the drum having an arcuate dam ring of a second predetermined height extending continuously about at least one-quarter of the arcuate interior of the drum adjacent the first end.

10. In a rotary drum with an arcuate interior having a first end and an opposing second end for spray graining seed particles with a liquid slurry while the drum is rotating having a feed inlet means adjacent the first end for feeding in seed particles and product fines, spraying means for spraying the liquid slurry in a predetermined spray slurry pattern within at least one spraying zone, drying means for introducing a heated gas into the drum and spray grained product particle outlet means for removing the product particles from the drum, the improvement comprising in combination:
   a. deflector means extending only in the at least one spraying zone, to deflect falling seed particles, product fines and spray grained particles the deflector means further overlying the spraying means and forming the upper limit of the at least one spraying zone; and
   b. at least one drying zone intermediate the at least one spraying zone and the opposing second end where spray grained particles fall in a substantially uninterrupted downward path through the heated gas.

11. The drum according to claim 10 further comprising a plurality of parallel, radially dispersed and spaced apart lifting flights about the arcuate interior in the at least one drying zone to carry the spray grained particles upwardly as the drum rotates until the particles fall in cascades downwardly toward the bed.

12. The apparatus according to claim 11 further comprising a plurality of parallel, radially dispersed and spaced apart lifting flights in the at least one spraying zone.

13. The apparatus according to claim 10 further comprising the spray grained product outlet means being adjacent the first end.

14. The apparatus according to claim 13 further comprising the drying means having an inlet at the first end.

15. The apparatus according to claim 11 further comprising the deflector means forming at least one generally elongate rectangular surface having a first edge farthest from the spraying means and a second edge closest to the spraying means.

16. The apparatus according to claim 15 further comprising the first edge being a predetermined desired distance from the spraying means so that the cascade of falling particles deflect off of the deflector means into the predetermined slurry spray pattern.

17. The apparatus according to claim 10 further comprising the drum having an annular dam ring of predetermined height extending continuously about the arcuate interior adjacent the second end.

18. The apparatus according to claim 10 further comprising the drum having an arcuate dam ring of a second predetermined height extending continuously about at least one-quarter of the arcuate interior of the drum adjacent the first end.

19. The apparatus according to claim 14 further comprising the drying means having an outlet adjacent the second end.

* * * * *

UNITED STATES PATENT AND TRADEMARK OFFICE
CERTIFICATE OF CORRECTION

PATENT NO. : 4,478,170  
DATED : October 23, 1984  
INVENTOR(S) : William G. Bridges, Craig A. Foster It is certified that error appears in the above-identified patent and that said Letters Patent is hereby corrected as shown below:

In column 5, at line 2 please delete "bearing 31" and insert --bearings 31--.

In column 7, at line 64 please delete "0100", "0.714" and "0.558" and insert --0100--, --0.714-- and --0.558--.

In column 7, at line 66 please delete "0400", "0.776" and "0.788" and insert --0400--, --0.776-- and --0.788--.

In column 7, at line 67 please delete "0500", "0.327" and "0.286" and insert --0500--, --0.327-- and --0.286--.

In column 8, at line 64 please delete "1.31", "0.093", "0.319" and "22.5" and insert --1.31--, --0.093--, --0.319-- and --22.5--.

In column 8, at line 66 please delete "0.180" and insert --0.186--.
In column 8, at line 66 please delete "1.542", "0.147" and "0.338" and insert --1.542--, --0.147-- and --0.338--.

In column 8, at line 67 please delete "0.908", "0.122", "0.221" and "23.7" and insert --0.908--, --0.122--, --0.221-- and --23.7--.

In column 9, at line 6 please delete "0900", "0.400" and "0.721" and insert --0900--, --0.400-- and --0.721--.

In column 9, at line 9 please delete "1300", "0.618" and "0.531" and insert --1300--, --0.618-- and --0.531--.

In column 9, at line 13 please delete "1700", "0.470" and "0.663" and insert --1700--, --0.470-- and --0.663--.

In column 9, at line 14 please delete "290" and insert --298--.

In column 9, at line 16 please delete "2130", "0.514" and "0.700" and insert --2130--, --0.514-- and --0.700--.

In column 9, at line 21 please delete "0500", ".483" and ".463" and insert --0500--, --.483-- and --.463--.

In column 9, at line 18 please delete "0100", "0.684" and ".537" and insert --0100--, --0.684-- and --.537--.

UNITED STATES PATENT AND TRADEMARK OFFICE
CERTIFICATE OF CORRECTION

PATENT NO. : 4,478,170

DATED : October 23, 1984

INVENTOR(S) : William G. Bridges, Craig A. Foster

It is certified that error appears in the above-identified patent and that said Letters Patent is hereby corrected as shown below:

In column 9, at line 24 please delete "0900", ".374" and ".485" and insert --0900--, --.374-- and --.485--.

In column 9, at line 28 please delete "1300", "0.178" and "(.637)" and insert --1300--, --0.178-- and --(.637)--.

In column 9, at line 32 please delete "1700", "0.264" and "(.577)" and insert --1700--, --0.264-- and --(.577)--.

In column 9, at line 36 please delete "2100", ".603" and "0.454" and insert --2100--, --.603-- and --0.454--.

In column 10, at line 6 please delete "0.99", "0.090", "0.315" and "27" and insert --0.99--, --0.090--, --0.315-- and --27--.

In column 10, at line 8 please delete "0.120" and insert --0.121--.

In column 10, at line 9, please delete "0.120" and insert --0.121--.

In column 10, at line 9 please delete "0.86", "0.121", "0.101", "0.280" and "26" and insert --0.86--, --0.121--, --0.101--, --0.280-- and --26--.

In column 10, at line 12 please delete "0.130" and insert --0.131--.

In column 10, at line 13 please delete "0.95", "0.14", "0.370" and "24.8" and insert --0.95--, --0.14--, --0.370-- and --24.8--.

In column 10, at line 15 please delete "1.202" and insert --0.202-- and delete "0.173" and insert --0.173--.

In column 10, at line 16 please delete "1.34", "0.502" and "21.6" and insert --1.34--, --0.502-- and --21.6--.

In column 10, at line 17 please delete "0.156" and insert --0.156--.

In column 10, at line 18 please delete "0.20", ".538" and "25.5" and insert --0.20--, --.538-- and --25.5--.

In column 10, at line 21 please delete "0.095", ".293" and "23.7" and insert --0.095--, --.293-- and --23.7--.

UNITED STATES PATENT AND TRADEMARK OFFICE
CERTIFICATE OF CORRECTION

PATENT NO. : 4,478,170

DATED : October 23, 1984

INVENTOR(S) : William G. Bridges, Craig G. Foster

It is certified that error appears in the above-identified patent and that said Letters Patent is hereby corrected as shown below:

In column 10, at line 24 please delete ".172", ".28" and "24.4" and insert --.172--, --.28-- and --24.4--.

In column 10, at line 28 please delete "0.618", "0.141", "0.26" and "26.9" and insert --0.618--, --0.141--, --0.26-- and --26.9--.

In column 10, at line 32 please delete ".777", "0.251", "0.291" and "18.2" and insert --.777--, --0.251--, --0.291-- and --18.2--.

In column 10, at line 36 please delete "1.67", "0.137", "0.371" and "26.9" and insert --1.67--, --0.137--, --0.371-- and --26.9--.

Signed and Sealed this

Twenty-second Day of October 1985

[SEAL]

Attest:

DONALD J. QUIGG

Attesting Officer

Commissioner of Patents and
Trademarks—Designate